United States Patent [19]

Flynn

[11] 3,865,657

[45] Feb. 11, 1975

[54] A SOLID COMPOSITE PROPELLANT CONTAINING FLUOROAMINO POLYMERS

[75] Inventor: James P. Flynn, Midland, Mich.

[73] Assignee: The Dow Chemical Company, Midland, Mich.

[22] Filed: May 28, 1965

[21] Appl. No.: 460,619

[52] U.S. Cl............. 149/19.3, 149/19.5, 149/19.91, 149/22, 149/42, 149/43
[51] Int. Cl.............................................. C06d 5/06
[58] Field of Search.......... 149/19, 75, 42, 44, 19.3, 149/19.5, 19.91, 22

[56] References Cited
UNITED STATES PATENTS 3,228,936  1/1966   Davis et al...................... 149/109 X
3,278,595  10/1966  Sheehan et al. ................ 149/109 X

OTHER PUBLICATIONS

Emeleus, "Advances in Inorganic Chemistry," Vol. 3, 1961, pp. 356–360.

Farber, Astronautics, August 1960, pp. 34, 40 and 42.

Primary Examiner—Benjamin R. Padgett
Attorney, Agent, or Firm—C. Kenneth Bjork; Lloyd S. Jowanovitz

[57] ABSTRACT

The present invention comprises a novel solid double base propellant composition exhibiting a high specific impulse. The composition contains particulated solid fuel, particulated solid oxidizer, a copolymer of perfluoroguanidine and formaldehyde, and, as a binder a difluoroamino containing organic ester. The use of the difluoroamino ester material as binder and the incorporation of perfluoroguanidine-formaldehyde copolymer into the composition assures the production of a high specific impulse in the propellant grain.

5 Claims, No Drawings

A SOLID COMPOSITE PROPELLANT CONTAINING FLUOROAMINO POLYMERS

This invention relates to propellants and more particularly is concerned with a novel double base propellant composition exhibiting a high specific impulse.

It is a principal object of the present invention to provide a novel high energy propellant composition exhibiting a high specific impulse.

It is another object of the present invention to provide a novel double base solid propellant composition that cures to a rubbery elastomer without undesirable gas formation.

These and other objects and advantages readily will become apparent from the detailed description presented hereinafter.

The present invention comprises a solid double-base propellant composition containing from about 3 to about 18 weight per cent of a particulated solid fuel, from about 1 to about 44 weight per cent of a particulated solid oxidizer, up to about 54 per cent of a copolymer of perfluoroguanidine and formaldehyde and from about 20 to about 40 weight per cent of a difluoroamino containing organic ester as a binder.

Ordinarily the fuel is a member selected from the group consisting of boron, beryllium, aluminum, beryllium hydride, aluminum hydride, lithium hydride, lithium aluminum hydride, solid boron hydrides, boron hydrides of amine complexes and mixtures thereof.

The oxidizer employed in the composition usually is selected from the group consisting of ammonium perchlorate, nitronium perchlorate, ammonium nitrate, hydrazine nitroformate, cyclotrimethylenetrinitramine, hydrazine perchlorate, hydroxylamine perchlorate and the like.

Preferably monomers and homopolymers or copolymers of difluoroamino-containing organic esters such as 2,3-bis(difluoroamino)propyl acrylate, 2,3-bis(difluoroamino)propyl methacrylate, 2,3-bis(difluoroamino)-propyl formate, mixtures of these difluoroamino propyl esters with ethylene glycol dimethyl acrylate and the like are used as the binder.

Perfluoroguanidine-formaldehyde copolymers employed in the present composition are those materials corresponding to the formula $[(NF_2)_2CNF(CH_2O)_y]_x$ where $y$ is an integer ranging from 1 to about 6 or more and $x$ is an integer greater than 1. A preferred composition is the 1:1 copolymer, i.e. where $y$ is the integer 1.

These copolymers can be prepared by reacting formaldehyde ($CH_2O$) with perfluoroguanidine, herein referred to as PFG, at a $CH_2O$/PFG gram-mole ratio of about 1 in the presence of from about 2 to about 10 weight per cent (based on the total reactants) of a cesium fluoride or rubidium fluoride catalyst at a maximum temperature of about minus 20° C. for a period of at least several hours.

One preferred embodiment of the present novel double base propellant composition consists essentially of on a weight basis about 12 per cent lithium, about 28 per cent nitronium perchlorate, about 36 per cent of a substantially 1:1 copolymer of perfluoroguanidine-formaldehyde, and as a binder about 12 per cent poly-bis(difluoroamino)propyl acrylate and about 12 per cent 2,3-bis (difluoroamino)propyl formate.

A second preferred embodiment of the present invention consists essentially of on a weight basis 12 per cent lithium, about 18 per cent ammonium perchlorate, about 42 per cent of the perfluoroguanidine-formaldehyde copolymer, and as a binder about 14 per cent poly-bis(difluoroamino)propyl acrylate and about 14 per cent 2,3-bis(difluoroamino)propyl formate.

The propellants usually are fabricated by adding and blending the fuel, oxidizer and acrylate monomer or polymer into a mixture of the perfluoroguanidine-formaldehyde (if employed) and 2,3-bis(difluoroamino)propyl formate at about 30° C. After producing a substantially homogeneous blend, the formulation is cast, extruded or otherwise formed and cured at from about room temperature to about 60° C. from about 16 to about 24 hours to produce a solid, elastomeric propellant grain of predetermined configuration.

Preferably, to obtain the optimum in performance and properties in the grain, the blending, forming and curing operations per cent carried out in an inert atmosphere, such as nitrogen or argon, for example, and in the absence of moisture. Also, substantially anhydrous mix components should be utilized. The resulting product grains can be stored indefinitely in a substantially anhydrous, inert atmosphere without detrimental physical degradation or performance loss.

The present composition having the difluoramino ester materials as binder, and which also may have incorporated therein a perfluoroguanidine-formaldehyde copolymer, has a high specific impulse and finds utility as a propellant for rockets and rocket driven missiles.

The following Examples will serve to further illustrate the present invention but are not meant to limit it thereto.

EXAMPLE 1

A number of propellant grains were formed by blending together about 26 weight per cent 2,3-bis(difluoroamino)propyl acrylate monomer, 12 weight per cent poly-2,3-bis(difluoroamino)propyl methacrylate, 12 weight per cent 2,3-bis(difluoroamino)propyl formate, 10 weight per cent lithium powder and 40 weight per cent finely divided nitronium perchlorate crystals. The resulting substantially homogeneous blend was cast into grains and these cured overnight, i.e. about 16 hours, at about 50° C. The cured grains were substantially void-free elastomeric materials.

Combustion studies on the cured products in closed bombs showed these burned smoothly and rapidly, without detonation, at pressures up to 1000 pounds per square inch.

EXAMPLE 2

A number of formulations of the present invention were fabricated into rocket grains. The combustion temperature and theoretical impulse of each of the resultant propellants were calculated. The propellant formulation data and performance results from this study are presented in Table I which follows.

Table I

| | Propellant Composition Weight Percent | | | | | | Results | |
|---|---|---|---|---|---|---|---|---|
| Run No. | PolyNFPA[1] | DPF[2] | PFG.CH$_2$O[3] | Li | NP[4] | AP[5] | Combustion Temperature K° | Specific Impulse Isp (sec.) |
| 1 | 10 | 30 | 42 | 12 | 6 | — | 3560 | 290.6 |
| 2 | 10 | 30 | 42 | 6 | 12 | — | 3856 | 290.1 |

Table I – Continued

| Run No. | Propellant Composition Weight Percent | | | | | | Results | |
|---|---|---|---|---|---|---|---|---|
| | PolyNFPA[1] | DPF[2] | PFG.CH₂O[3] | Li | NP[4] | AP[5] | Combustion Temperature K° | Specific Impulse Isp (sec.) |
| 3  | 16 | 16 | 48 | 6  | 14 | —  | 4041 | 295.1 |
| 4  | 10 | 30 | 36 | 6  | 18 | —  | 3982 | 293.2 |
| 5  | 10 | 30 | 30 | 12 | 18 | —  | 3712 | 294.7 |
| 6  | 14 | 14 | 42 | 12 | 18 | —  | 3947 | 301.3 |
| 7  | 10 | 30 | 36 | 3  | 21 | —  | 4018 | 291.9 |
| 8  | 13 | 13 | 39 | 12 | 23 | —  | 4021 | 301.9 |
| 9  | 14 | 14 | 42 | 6  | 24 | —  | 4132 | 299.9 |
| 10 | 10 | 30 | 27 | 9  | 24 | —  | 3917 | 294.9 |
| 11 | 12 | 12 | 36 | 12 | 28 | —  | 4046 | 301.6 |
| 12 | 10 | 10 | 30 | 18 | 32 | —  | 3795 | 292.4 |
| 13 | 10 | 30 | 18 | 9  | 33 | —  | 3914 | 293.7 |
| 14 | 10 | 30 | 12 | 12 | 36 | —  | 3814 | 291.4 |
| 15 | 10 | 10 | 30 | 6  | 44 | —  | 3904 | 289.3 |
| 16 | 18 | 18 | 54 | 9  | —  | 1  | 3658 | 289.1 |
| 17 | 10 | 30 | 48 | 6  | —  | 6  | 3604 | 285.2 |
| 18 | 10 | 30 | 36 | 12 | —  | 12 | 3391 | 286.4 |
| 19 | 10 | 30 | 30 | 15 | —  | 15 | 3099 | 278.2 |
| 20 | 14 | 14 | 42 | 12 | —  | 18 | 3552 | 292.1 |
| 21 | 12 | 12 | 36 | 12 | —  | 28 | 3578 | 289.8 |
| 22 | 10 | 10 | 30 | 6  | —  | 44 | 3622 | 283.1 |

[1] poly-2,3-bis(difluoramino)propyl acrylate
[2] 2,3-bis(difluoroamino)propyl formate
[3] perfluoroguanidine-formaldehyde; substantially 1:1 copolymer
[4] nitronium perchlorate
[5] ammonium perchlorate In a manner similar to that described for the foregoing Examples solid double base propellant grains can be fabricated using the other fuel oxidizer and binder components set forth hereinbefore.

Various modifications can be made in the present invention without departing from the spirit or scope thereof for it is understood that I limit myself only as defined in the appended claims.

I claim:

1. A solid propellant composition comprising on a weight basis;
   a. from about 3 to about 18 percent of a particulated solid fuel,
   b. from about 1 to about 44 per cent of a particulated solid oxidizer,
   c. up to about 54 per cent of a copolymer of perfluoroguanidine and formaldehyde, and
   d. from about 20 to about 40 per cent of a difluoramino containing organic ester.

2. A solid propellant composition consisting essentially of on a weight basis;
   a. from about 3 to about 18 per cent particulate lithium,
   b. from about 1 to about 44 per cent of a particulate member selected from the group consisitng of nitronium perchlorate and ammonium perchlorate,
   c. up to about 54 per cent of a substantially 1:1 copolymer of perfluoroguanidine and formaldehyde,
   d. from about 10 to about 30 per cent of 2,3-bis(difluoramino)propyl formate, and
   e. from about 10 to about 26 per cent of a member selected from the group consisting of 2,3-bis(difluoramino)propyl acrylate, 2,3-bis(difluoramino)-propyl methacrylate, homopolymers of these esters and mixtures of said -acrylate, -methacrylate and homopolymers thereof.

3. A solid propellant composition consisting essentially of on a weight basis:
   a. from about 3 to about 18 per cent particulate lithium,
   b. from about 6 to about 44 per cent particulate nitronium perchlorate,
   c. from about 12 to about 48 per cent of a substantially 1:1 copolymer of perfluoroguanidine and formaldehyde,
   d. from about 10 to about 30 per cent 2,3-bis(difluoramino)propyl formate, and
   e. from about 10 to about 16 per cent poly-2,3-bis(difluoramino)propyl acrylate.

4. A solid propellant composition consisting essentially of on a weight basis:
   a. from about 6 to about 15 per cent particulate lithium,
   b. from about 1 to about 44 per cent ammonium perchlorate,
   c. from about 30 to about 54 per cent of a substantially 1:1 copolymer of perfluoroguanidine and formaldehyde,
   d. from about 10 to about 30 per cent 2,3-bis(difluoramino)propyl formate, and
   e. from about 10 to about 14 per cent poly-2,3-bis(difluoramino)propyl acrylate.

5. A solid propellant composition consisting essentially of on a weight basis:
   a. about 10 per cent particulate lithium,
   b. about 40 per cent particulate nitronium perchlorate,
   c. about 26 per cent 2,3-bis(difluoramino)-propyl acrylate,
   d. about 12 per cent poly-2,3-bis(difluoramino)propyl methacrylate, and
   e. about 12 per cent 2,3-bis(difluoramino)-propyl formate.

* * * * *